United States Patent [19]

Bass et al.

[11] 3,778,718

[45] Dec. 11, 1973

[54] MODULATION SYSTEM

[75] Inventors: Harland A. Bass, San Jose; Yves C. Faroudja, Sunnyvale, both of Calif.

[73] Assignee: Avco Corporation, San Jose, Calif.

[22] Filed: Apr. 28, 1972

[21] Appl. No.: 248,556

[52] U.S. Cl. .................... 325/139, 325/61, 332/17

[51] Int. Cl. .................... H03c 5/00

[58] Field of Search .................... 178/DIG. 3, 6.6 A; 179/100.2 MD, 15 BU, 15 BT; 325/45, 46, 47, 49, 59, 60, 139, 145; 332/17, 21

[56] References Cited

UNITED STATES PATENTS

| | | | |
|---|---|---|---|
| 3,260,964 | 7/1966 | Whitehead et al. | 325/47 X |
| 2,881,394 | 4/1959 | Ernyei | 332/41 |
| 3,207,854 | 9/1965 | Johnson | 178/6.6 A X |
| 3,486,117 | 12/1969 | Groves et al. | 325/139 X |

*Primary Examiner*—Benedict V. Safourek
*Attorney*—Harvey W. Mortimer et al.

[57] ABSTRACT

A system for modulating a wideband information signal, in which the information signal is separated into a multiplicity of frequency bands. The several frequency bands are used to modulate a carrier signal in two ways, i.e., frequency modulation and suppressed-carrier amplitude modulation, the modulated signals being added to provide a composite output signal. The composite signal has a maximum number of desirable characteristics and a minimum number of undesirable characteristics, in that the advantages of wide-deviation are partially utilized while the over-all band width is not excessive.

25 Claims, 9 Drawing Figures

MODULATION SYSTEM

BACKGROUND AND OBJECTS OF THE INVENTION

This invention relates to a method and apparatus for taking advantage of desirable characteristics of certain methods of modulation, while minimizing the undesirable characteristics. It is of particular value in the recording of television signals on magnetic tape.

Every method of modulation has a set of definable characteristics. Some of these characteristics may be very desirable in one application, while some of those same characteristics may be undesirable in another application. For example, wide deviation frequency modulation (FM) has many strong sidebands, and as a result of those sidebands has excellent signal-to-noise ratios. Hence it is used in commercial FM broadcasting. However, if wide deviation FM is used to modulate a carrier only slightly above the maximum modulating signal, as is the practice (due to limitations of practical hardware) in the magnetic recording of video televison signals, the lower second and higher order sidebands may fold over through zero frequency into the useful band, causing "moire" problems or interfering with the color signal if a color recording is being made. One approach has been to restrict the deviation by using an index of modulation of about 0.2, so that effectively there is only one lower sideband. The result is a substantial reduction in the signal-to-noise ratio from that available in FM broadcasting, although the fold-over problem has been eliminated. An illustration of this approach is that disclosed in the U.S. Pat. to Ginsburg, et al., No. 2,956,114, issued Oct. 11, 1960, entitled "Broad Band Magnetic Tape System and Method." This approach suffers from the shortcoming that it pursues a conventional narrow-deviation FM process for the entire spectrum of modulating intelligence and therefore abandons and eschews the advantages of wide deviation frequency modulation.

As another example, amplitude modulation has the advantage of a narrower bandwidth than wide-deviation FM for a given spectrum of modulating signals. It has the disadvantage, however, that it is subject to amplitude variations caused by the transmission medium (e.g., magnetic tape) which are indistinguishable on demodulation from those variations present in the original modulating signal.

As still another example, suppose that we were to solve the fold-over problem by eliminating all sidebands except the first by use of the Armstrong or indirect FM system. It being known that it is desirable to negate the production of side bands other than the first, the question is raised as to whether or not to utilize indirect FM to handle the video intelligence. The indirect or Armstrong type of FM is negated for such an over-all task because it postulates an integrator for the whole signal band. In effect, Armstrong FM utilizes phase modulation in the sense that the voltage actually used to produce the phase variation is the signal intelligence modified by passage through an integrator, in which the transmission is inversely proportional to frequency, instead of being the actual modulating signal. For the sake of illustration, let us assume that the video spectrum extends from 10 Hz to 4 MHz, and that the amplitudes of the signals are the same at all frequencies within that band. On integration, the amplitude of the signal is divided by its frequency, so that the signal actually applied to the modulator will have an amplitude range from low frequency (10 Hz) to high frequency (4 MHz) of 400,000 to one. That is, the signal applied to the modulator at 4 MHz will be 112 db below the signal applied to the modulator at 10 Hz. This signal will be so small that it will have virtually disappeared into the noise associated with electronic circuits. What is desired is a fairly uniform transmission response. It will be understood that Armstrong modulation cannot be used for the task of handling the entire video spectrum because the response is so grossly non-uniform.

A major problem encountered in recording video signals on magnetic tape is the unwanted amplitude variations due to variations in the magnetic material, differences from one recording or playback head to the next, and random tape-head separations. As a result, it has been necessary to use FM recording. However, as we have explained above, it has been necessary to use narrow deviation FM to avoid the fold-over problem. However, narrow deviation FM suffers from the disadvantage of reduced signal-to-noise ratio of the playback signal.

One of the directive concepts of the present invention is the perception that a substantial part of the video spectrum can be used in conjunction with a wide-deviation FM process and that suppressed-carrier amplitude modulation (AM) can usefully be exploited to handle another part of the video spectrum, the cooperative and complementary operation of both processes being such that the entire video spectrum is accommodated in a novel manner by video tape. At the same time the advantages of wide-deviation, heretofore despaired of by prior art workers, are realized over a very large part of the video spectrum.

It is one object of this invention to provide a method and means whereby a substantially increased number of desirable features of a modulated signal may be retained while decreasing the number of undesirable characteristics which must be accepted.

It is a further object of this invention to provide an improved method and means for the magnetic recording of video signals in which a substantially wider deviation FM may be used than heretofore and without encountering the fold-over problem.

Another object of this invention is to provide a modulation system for video recording which is less sensitive to noise.

Still another object of this invention is to provide a modulation system and method which is relatively insensitive to the unwanted amplitude variations introduced by magnetic recording and reproducing apparatus.

A further object of this invention is to provide a modulation system for, and method of recording and reproducing, television signals substantially free of "moire" and of interference with the color signal.

According to the above and other objects, the present invention provides a modulation system and method in which a given information signal is divided into a multiplicity of frequency bands. Each frequency band is used to modulate a carrier in such a manner that the most desirable modulation characteristics are selected for each frequency band of the modulation signal, and the resulting modulated signals are added and applied to the transmission medium. Demodulation at the receiver is accomplished by use of appropriate conventional demodulation circuits.

In the preferred embodiment herein shown a wide-band information signal is separated by means of filters into a lower frequency band and an upper frequency band. The lower frequency band is used to frequency modulate a carrier using any one of a number of conventional FM modulators which produce several sidebands, and using a wide deviation system. The upper frequency band is suppressed-carrier amplitude-modulated, so that only the first order sidebands appear. The index of modulation and the value of the frequency which divides the lower video frequency band from the upper video frequency band are so proportioned as to insure that all significant sidebands from the FM modulator lie within the over-all band available around the carrier, while the suppressed-carrier amplitude modulation insures that only the first sidebands due to modulating signals in the upper video frequency band will appear. These last sidebands will, of course, appear only within the minimum-width band necessary around the carrier. The signals resulting from the two kinds of modulation are then added to produce a composite modulated signal. Hence an improved signal-to-noise ratio has been achieved while at the same time restricting the modulated signals to a bandwidth around the carrier no greater than twice the maximum modulating signal frequency. The filter characteristics of the filters used to separate the information into upper and lower frequency bands are preferably somewhat tapered and overlapping so as to provide a smooth transition between the suppressed-carrier amplitude modulated and frequency modulated portions of the composite modulated signal.

An advantage of the modulation system and method of the present invention is that it is capable of producing modulated signals which are compatible with conventional demodulators, such as, for example, pulse-density demodulators.

Other objects and advantages of the present invention will be apparent from the following detailed description and accompanying drawings which set forth, by way of example, the principle of the present invention and the preferred mode of carrying out that principle.

DETAILED DESCRIPTION OF THE INVENTION

Figure 1:
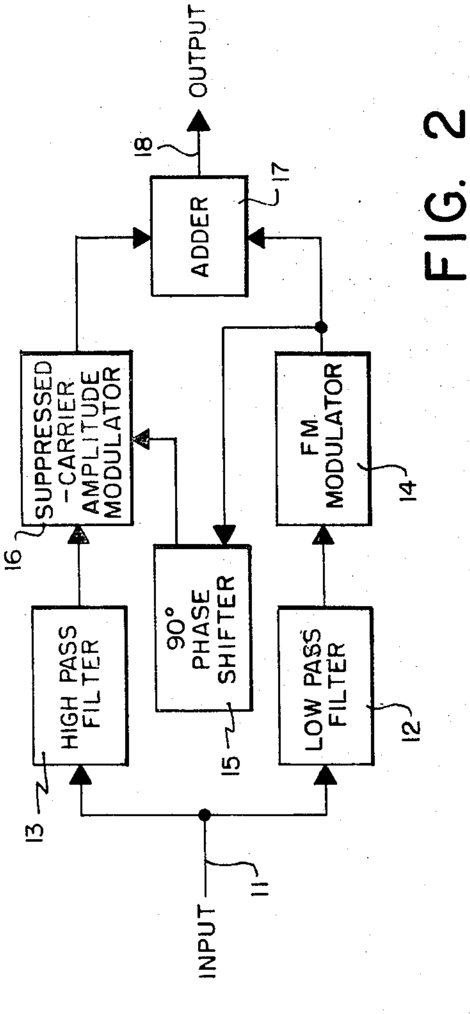
FIG. 1 is a block diagram of a modulation system according to the present invention.

In the FIG. 1 modulation system the video frequency spectrum is separated into two bands. The lower frequency band is wide-deviation frequency modulated onto a carrier and the upper frequency band is suppressed-carrier amplitude modulated onto the same carrier, but shifted by 90°, to become as a form of phase modulation after combination.

Figure 2:
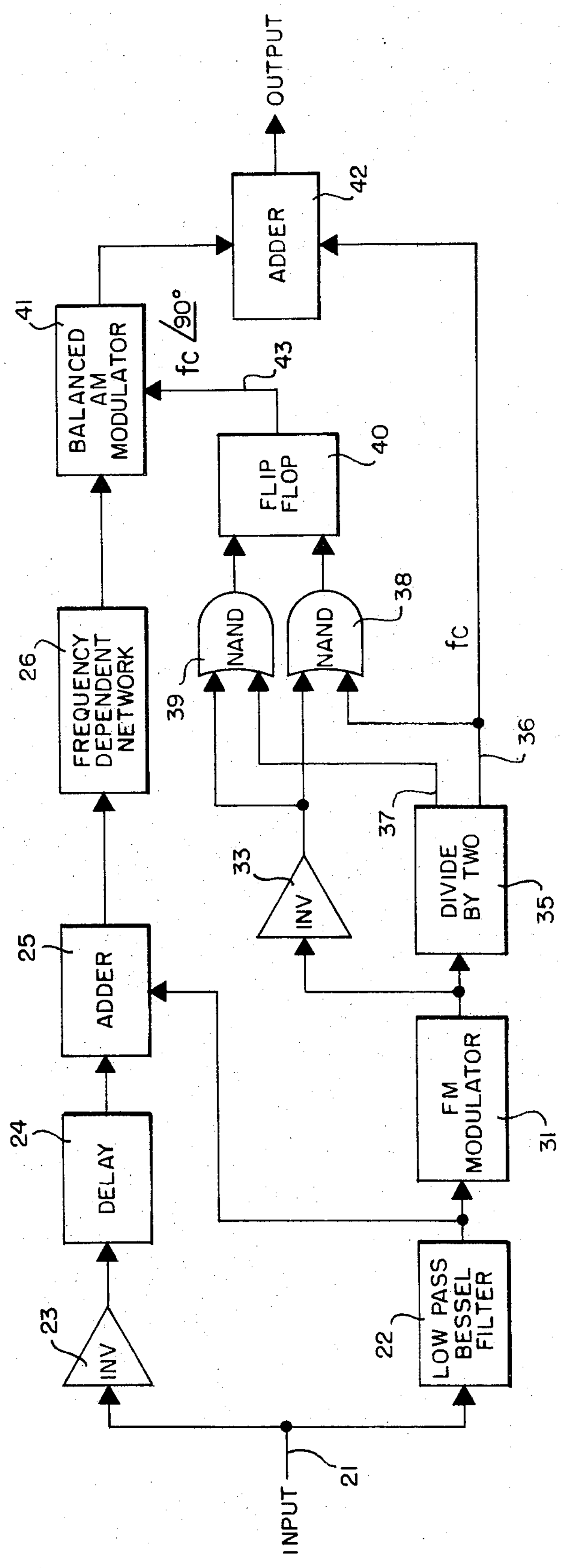
FIG. 2 is a detailed block diagram of an alternate embodiment of the modulation system of the present invention.

In the FIG. 2 embodiment of the invention, again the video spectrum is separated into upper and lower bands. The lower band is wide-deviation frequency modulated onto a carrier but the upper band, before application to the balanced modulator, is applied to a frequency dependent network in order to optimize the signal frequency response in relation to the recording medium characteristics.

Referring in detail to FIG. 1 of the drawings, there is shown a block diagram of one form of modulation system of the present invention. A wide-band input information signal, such as, for example, a television signal, is fed into the system via line 11. It will be appreciated that, if desired, the input signal may be subjected to preliminary processing, such as filtering, pre-emphasis, and white noise clipping prior to being fed into the system of FIG. 1 via line 11.

The input signal on line 11 is applied, in parallel, to low-pass filter 12 and high-pass filter 13 so as to separate the input signal into a low-frequency portion and a high-frequency portion. For example, in the case of a television input signal having a frequency range from 30 Hz to 2.5 MHz, the upper cut-off frequency of low-pass filter 12 may be 500 KHz and the corresponding lower cut-off frequency of the high-pass filter 13 may likewise be 500 KHz. Moreover, the transfer-impedance characteristics of filters 12 and 13 are preferably tapered rather than sharply cut off, so as to provide a smooth blending of the frequency-modulated and suppressed-carrier amplitude-modulated signals as will be explained in greater detail hereinbelow. In addition, the use of filters having tapered filter characteristics reduces the required precision of the matching of the low-pass filter 12 and high-pass filter 13 and also reduces the effect on system performance of spurious variations in the values of the filter components as may be caused, for example, by temperature changes. It will be appreciated that filters 12 and 13 may be of conventional design using active and/or passive components, and any desired way of separating the high-frequency and low-frequency portion maybe used.

The signal from low-pass filter 12 is fed to FM modulator 14, which is a conventional direct type well known to those skilled in the art, which includes a source of carrier-frequency signal which is varied or modulated by an input modulating signal. For the purpose of recording television signals on magnetic tape, the carrier frequency may be on the order of about 4–6 MHz, for example. The carrier signal is generated within frequency modulator 14.

The signal from high-pass filter 13 is fed as a modulating signal to suppressed-carrier amplitude modulator 16. The carrier signal for modulator 16 is supplied from the carrier source of FM modulator 14 through 90° phase shifter 15. It will be appreciated by those skilled in the art that suppressed-carrier amplitude modulation can be accomplished by applying the modulating signal and the carrier to a conventional balanced amplitude modulator. The upper video band is the modulating signal. The carrier signal may be the entire output of the FM modulator 16, including both carrier and side band components, since it has been found that those side band components do not interfere with the desired operation.

The signals from frequency modulator 14 and suppressed carrier amplitude modulator 16 are then algebraically added by adder 17 to provide the output signal on line 18. It will be appreciated by those skilled in the art that, if the information signal portion applied to the FM modulator 14 is of the form $e(t)=E_m \sin \omega_m t$ and the unmodulated carrier is of the form $E_c \cos \omega_c t$, then the FM signal $e_{FM}$, from FM modulator 14, is given by:

$$e_{FM} = E_c \cos [\omega_c t + (2\pi\Delta f/\omega m) \sin \omega_m t] \quad (1)$$

$$= E_c \cos (\omega_c t + m_f \sin\omega_m t) \quad (2)$$

where $E_c$ is the carrier amplitude, $\omega_c$ is the angular frequency of the carrier, $\omega_m$ is the angular frequency of the modulating signal, and $m_f$ is the modulation index which equals $$\Delta\omega/\omega_m = k_f E_m/\omega_m \quad (2a)$$

where $k_f$ is a constant. Expressed in another way:

$$e_{FM} = E_c [J_o (m_f) \cos \omega_c t + J_1 (m_f) \cos (\omega_c + \omega_m) t - J_1 (m_f) \cos (\omega_c - \omega_m)t + J_2 (m_f) \cos (\omega_c + 2\omega_m)t - J_2 (m_f) \cos (\omega_c - {}_2\omega_m)t + \ldots]$$

where $J_0$, $J_1$, $J_2$, etc., are the Bessel functions of order 0, 1, 2, etc. Similarly, if the information signal applied to suppressed-carrier amplitude modulator 16 is again of the form $e(t)=E_m \sin \omega_m t$ and when the modulating frequency is high enough to introduce negligible modulation of the carrier frequency of $e_{FM}$, then the suppressed-carrier amplitude modulated signal $e_{AM}$ from modulator 16 is given by:

$$e_{AM} = (E_c E_m/2) [\cos (\omega_c + \omega_m) t + \cos (\omega_c - \omega_m) t] \quad (4)$$

It will therefore be appreciated that the first-order sidebands of the frequency-modulated portion of the output signal will blend smoothly with the first-order sidebands of the suppressed-carrier amplitude-modulated portion as a result of the tapered and overlapping filter responses to provide a total modulated output signal containing all of the information in the input signal on line 11.

It will be appreciated that, because suppressed-carrier amplitude modulation produces only a first-order upper sideband $(\omega_c + \omega_m)$ and a first-order lower sideband $(\omega_c - \omega_m)$ and does not produce second-order $(\omega_c \pm 2\omega_m)$, third-order $(\omega_c \pm 3\omega_m)$, or higher order sidebands, there is no danger that such second, third or higher order sidebands caused by high modulating frequencies will fold over through zero frequency into the portion of the spectrum occupied by the first-order lower sideband so as to cause "moire" or color channel interference.

The FIG. 1 embodiment, just described, when employing a conventional FM demodulator, emphasizes the high frequency components and that capability may be exploited as desired.

While the FM signal from modulator 14 contains higher order sidebands, all such higher order lower sidebands fall, for practical purposes, within the range between the carrier frequency and zero frequency and thus do not cause a problem of "moire" interference. For example, assuming that the frequency deviation of the modulated signal corresponding to the maximum amplitude of the modulating signal is at least equal to the highest modulating frequency applied from low-pass filter 12 to FM modulator 14, as many as the first eight lower sidebands of the FM modulated signal will fall within the range between zero frequency and the carrier frequency. Because higher order sidebands of the FM modulated signal have progressively smaller amplitudes, the problem of "moire" interference due to fold-over through zero frequency is substantially eliminated.

As a specific example, assume a modulation index of unity, carrier frequency of 4 MHz, and modulating frequency of 500 KHz. The fifth-order lower sideband, appearing at 1.5 MHz, is 72 db below the unmodulated carrier, and higher order side bands will be still smaller. If suppressed-carrier amplitude modulation is used for modulating frequencies above 500 KHz, only the first order side bands appear for modulating frequencies greater than 500 KHz, and there can be no fold-over if the maximum modulating frequency is below 4 MHz.

Let us suppose that for the example in the previous paragraph the maximum frequency of the modulating signal is 2.5 MHz, requiring a bandwidth from 1.5 MHz to 6.5 MHz (4.0 MHz ± 2.5 MHz). Suppose further that signals folded over back into this band must be at least 40 db below the unmodulated carrier, and that the upper limit of the lower frequency band (applied to the FM modulator) is again 500 KHz. The first lower sideband which will fold over back into the desired band is the eleventh-order sideband. Reference to a table of Bessel functions shows that practical modulation indices in the vicinity of one result in folded sideband far below the 40 db down specification. By contrast, had FM modulation been used for the full band of modulating frequencies (up to and including 2.5 MHz), the first lower sideband which would fold over back into the desired band is the third-order sideband. To meet the 40 db down specification, it would be necessary to limit the index of modulation to approximately 0.35. The present invention may therefore lead to higher modulation indices than conventional FM and possibly to higher signal-to-noise ratios. It will be appreciated that the numerical values given are for illustration only, and are used to emphasize the magnitude of the advantages which may be gained by adoption of our invention.

In FIG. 1, it may be considered that the adder 17 combines the carrier frequency component $\omega_c$ of the output of FM modulator 14 with the suppressed-carrier AM output from balanced modulator 16. Due to the 90° phase shifter 15, this combination has some of the characteristics of a phase-modulated signal, as described in *Electronic and Radio Engineering* by F.e. Terman (McGraw-Hill, 1955) page 603, and FIGS. 17–10. However, this modulated signal is characterized by but first-order sidebands, thereby avoiding roll-over as described above. Instead of having the phase shifter between FM modulator 14 and AM modulator 16, it may instead be positioned between FM modulator 14 and adder 17, or else between AM modulator 16 and adder 17. However, for greater practicality the arrangement shown in FIG. 1 is preferred.

Referring now to FIG. 2 of the drawings, there is shown a detailed block diagram of an alternate embodiment of the modulation system according to the present invention. A wide-band input signal, such as for example, a television signal, is applied to the system of FIG. 2 via line 21. As mentioned in connection with FIG. 1, the input signal may be subjected to preliminary processing, such as filtering, pre-emphasis, white clipping, etc., prior to being applied to the modulation system shown in FIG. 2.

The input signal is fed in parallel to a low-pass Bessel filter 22 and an active high-pass filter including inverter 23, delay 24, adder 25 and low-pass filter 22. For purposes of illustration, the Bessel filter 22 may have an upper cut-off frequency of about 500 KHz. The phase characteristic of a Bessel filter is such that the phase lag introduced by the filter increases with increasing frequency, thus resulting in an approximately constant time delay over the range of frequencies passed by the filter.

The high-pass filter used in the modulation system of FIG. 2 is an active filter which uses the output signal from Bessel filter 22 to assure the desired fit of the transfer characteristics of the low-pass and high-pass filters. The input signal is applied to inverter 23 whose output is applied to delay circuit 24 which delays the signal by a time substantially equal to the time delay of the Bessel filter 22. Thus, the signal applied to adder 25 from delay circuit 24 and the signal applied to adder 25 from Bessel filter 22 are equally delayed in relation to the input signal on line 21. Because of the signal inversion caused by inverter 23, adder 25 acts to subtract the low-frequency portion of the information signal, which appears at the output of Bessel filter 22, from the full-frequency information signal that appears at the output of delay 24. The resulting output signal from adder 25 will contain only the high-frequency components of of the information signal, the low-frequency components having been subtracted away. More precisely, the output signal $e_1(t)$ from low-pass Bessel filter 22 will be of the form: $e_1(t) = E_{m1} \sin \omega_{m1} t$, where $\omega_{m1}$ is the modulating frequency passed through filter 22. The output signal $e_2(t)$ from adder 25 will be of the form: $e_2(t) = E_{m2} \sin \omega_{m2} t$, where $\omega_{m2}$ is the modulating frequency at the output of adder 25.

Figure 3A:
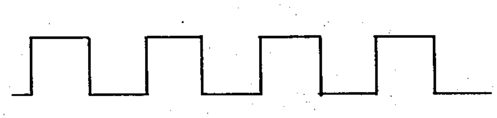
FIGS. 3A to 3G are graphs of the waveforms at certain points in the modulation system of FIG. 2.

The signal from Bessel filter 22 is applied to a direct frequency modulator 31 and serves to modulate a carrier signal having a frequency of $2f_c$. For purposes of illustration frequency modulator 31 may be assumed to be a circuit of the multi-vibrator type, which produces a two-valued output signal of the type shown in FIG. 3A.

Figure 3B:
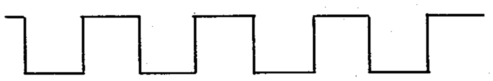
Figure 3C:
Figure 3D:
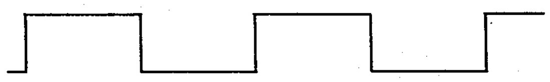

The output signal from frequency modulator 31 is applied in parallel to an inverter 33 and a divide-by-two circuit 35 which may be of a type well known to those skilled in the art, such as, for example, a single stage of a conventional binary counter. The output signal from inverter 33 is shown in FIG. 3B, while the complementary outputs of divide-by-two circuit 35, which appear on lines 36 and 37, are shown in FIGS. 3C and 3D, respectively. They do, of course, have a carrier frequency $f_c$.

Figure 3E:
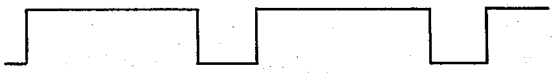
Figure 3F:
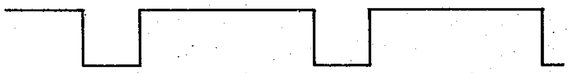
Figure 3G:

The output signal from inverter 33 is applied in parallel to NAND circuits 38 and 39, while the complementary outputs from divide-by-two circuit 35 which appear on line 36 and 37 are applied respectively to NAND circuits 38 and 39. The resulting output signals from NAND circuits 38 and 39 are shown in FIGS. 3E and 3F, and are applied to flip-flop 40. The output signal from flip-flop 40 is then as shown in FIG. 3G. Both NAND circuits 38 and 39 and flip-flop 40 may be of a conventional type well known to those skilled in the art.

It will be seen that, as a result of the logical processing by inverter 33, divide-by-two circuit 35, NAND circuits 38 and 39 and flip-flop 40, the output signal (FIG. 3G) from flip-flop 40 is 90° out of phase with the output signal (FIG. 3C) on line 36 from divide-by-two circuit 35. It will be appreciated by those skilled in the art that the foregoing is simply one method of obtaining signals having a 90° phase relation over a wide frequency range, with a well-defined sign of the phase shift and that other techniques for accomplishing this purpose may be employed within the spirit and scope of this invention.

The output signal on line 36 from divide-by-two circuit 35 is a frequency-modulated signal having a carrier frequency of $f_c$. More specifically, neglecting the harmonics of the carrier frequency, the frequency-modulated signal on line 36 is of the form set forth in equation (3) above. It is applied to adder 42. The nature of the other input to adder 42 will now be explained.

The output signal from adder 25 is applied to frequency dependent network 26. The function of network 26 is to modify the frequency response of the modulated signal in order to optimize system performances in presence of a noisy and limited-bandwidth recording medium. In practice, these limitations lead to a relative reduction of the high frequencies in network 26. Reference is made to Philip F. Panter, *Modulation, Noise and Spectral Analysis* (New York: McGraw-Hill, 1965), page 384, FIG. 12–2, for a showing of an indirect FM modulator comprising a source of modulating signals, an integrator, a carrier frequency source, a carrier phase shifter, and an adder or summing network, generally similar to those illustrated in FIG. 2. In FIG. 2 the shifted carrier appears on line 43 and the mode of providing the shifted carrier is more elaborate, as described above. The output signal from frequency dependent network 26 is applied to balanced AM modulator 41 together with the output from flip-flop 40, on line 43, which comprises the carrier shifted by 90° together with the sidebands from the FM modulator.

In general, if a large amplitude signal is present in the lower frequency band of a video signal, then a small amplitude signal (small $E_{m2}$) will be present in the upper frequency band. Since the components of the signal from the suppressed-carrier amplitude modulator 41 are all directly proportional to $E_{m2}$, we have small sidebands at $\omega_c \pm \omega_{m2}$, and still smaller and negligible values for the other sidebands. Conversely, if a large amplitude is present in the upper frequency band (large $E_{m2}$) of a video signal, then small signals are present in the lower frequency band, resulting in a small index of modulation $m_{f1}$. Then $J_0$ ($m_{f1}$) is essentially unity, but the higher order Bessel functions are nearly zero. We have found for practical video signals that a system built according to the principles of this invention and using circuitry indicated in block diagram form by FIG. 2 will not have intermodulation components of sufficient size to degrade the resulting picture on playback. That is, the output signal $e_{AM}$ from balanced amplitude modulator 41 is given for all practical purposes by the expression:

$$e_{AM} = (-KE_{m2}E_c/2\omega_{m2})\ [J_0(m_{f1}) \sin (\omega_c + \omega_{m2})t + J_0(m_{f1}) \sin (\omega_c - \omega_{m2})t] \quad (5)$$

The output signal from balanced AM modulator 41 is added to the frequency-modulated signal on line 36 in adder 42. Because the carrier applied on line 43 to balanced AM modulator 41 is at a 90° phase angle to the carrier frequency component of the FM signal on line 36, the sidebands of the suppressed-carrier output signal from balanced AM modulator 41 are at 90° to the carrier frequency component of the FM signal on line 36. Therefore, upon being added to the FM signal on line 36, the suppressed-carrier signal from balanced AM modulator 41 becomes added with a phase quadrature relationship to the FM signal in the adder 42. This combination takes on the characteristics of a frequency-modulated signal, but with only first-order sidebands. Moreover, because of the tapered characteristics of low-pass Bessel filter 22 and of the high-pass filter comprising low-pass filter 22, inverter 23, delay 24, and adder 25, the suppressed-carrier amplitude modulated high-frequency components and the frequency-modulated low frequency components blend smoothly in the region in which there is overlap between the filters.

The unit 26 is a frequency selective circuit to optimize signal-to-noise ratio in a noisy recording medium.

The characteristics of the system of FIG. 2 may now be examined. To begin with, wide deviation FM may be used for the signals of the lower band of modulating frequencies. Assume for the sake of illustration a carrier frequency of 4 MHz, and cutoff of the low-pass filter at 500 KHz. Assume further that only the band from 1.5 MHz to 6.5 MHz (4.0 MHz ± 2.5 MHz) is to be used. As shown above for the system of FIG. 1, high indices of modulation (in the vicinity of 1) may be used and generate folded sidebands only far below the 40 db limit.

Finally, it will be appreciated that, because suppressed-carrier amplitude modulation does not produce second and higher order sidebands, the problem of "moire" and color channel interference is avoided. Further, because suppressed-carrier amplitude modulation may be used for the high-frequency portion of the spectrum, an improvement in signal-to-noise ratio is possible without introduction of moire or folded sidebands effects.

The principle of the present modulation system has been illustrated by reference to certain embodiments described in the form of block diagrams including various subsystems, circuits and components. It will be appreciated that such subsystems, circuits and components may be of the conventional type known to those skilled in the art which are capable of performing the indicated functions. It will be appreciated further that various modifications and adaptions of the present modulation system may be made without departing from the spirit and scope of the present invention, which is set forth with particularity in the appended claims.

What is claimed is:

1. A modulation system comprising:

a source of modulating signal having a high-frequency portion and a low-frequency portion;

a frequency modulator for producing a frequency-modulated signal in response to said low-frequency portion of said modulating signal;

a suppressed-carrier amplitude modulator having an input coupled to the output of said frequency modulator for modulating said frequency-modulated signal by said high-frequency portion of said modulating signal to produce a suppressed-carrier amplitude-modulated signal; and means coupled to the outputs of said frequency-modulator and said suppressed carrier amplitude modulator for combining said frequency-modulated signal and said suppressed-carrier amplitude modulated signal to provide a combined modulated signal.

2. The modulation system of claim 1, further comprising filter means for separating said modulating signal into a high-frequency component and a low-frequency component, said filter means comprising:

a low-pass filter for passing the portion of said modulating signal below a predetermined frequency the output of said low-pass filter being coupled to an input of said frequency modulator; and a high-pass filter for passing the portion of said modulating signal above said predetermined frequency the output of said high-pass filter being coupled to an input of said suppressed carrier amplitude modulator.

3. The modulation system of claim 2, wherein the transfer impedance characteristics of said low-pass filter and said high-pass filter are tapered to provide a gradual transition between said low-frequency portion and said high-frequency portion of said modulating signal.

4. The modulation system of claim 2, wherein the transfer impedance characteristic of said high-pass filter is independent of the frequency of said modulating signal.

5. The modulation system of claim 2, wherein the transfer impedance characteristic of said high-pass filter varies with the frequency of said modulating signal.

6. The modulation system of claim 2, wherein said low-pass filter is characterized by a substantially constant time delay for all frequencies in said low-frequency portion of said modulating signal.

7. The modulation system of claim 6, wherein said low-pass filter comprises a Bessel filter.

8. The modulation system of claim 6, wherein said high-pass filter comprises:

time delay means for delaying said modulating signal by an amount substantially equal to said time delay of said low-pass filter to produce a delayed modulating signal; and means for subtracting said low-frequency portion of said modulating signal from said delayed modulating signal to produce said high-frequency portion of said modulating signal.

9. The modulating system of claim 8, wherein said subtracting means comprises:

means for inverting said delayed modulating signal with respect to said low-frequency portion of said modulating signal; and means for adding said inverted delayed modulating signal and said low-frequency portion of said modulating signal to provide said high-frequency portion of said modulating signal.

10. The modulation system of Claim 9, further comprising:

means for modifying the frequency response of said high-frequency portion of said modulating signal, and means for applying said modified frequency response high-frequency portion of said modulating signal to the input of said suppressed-carrier amplitude modulator.

11. The modulation system of Claim 2, wherein the ratio of a. the frequency deviation of said frequency-modulated signal corresponding to the maximum amplitude of said modulating signal to (b) said predetermined frequency, is at least unity.

12. A modulation system comprising:

filter means for separating a modulating signal into a high-frequency portion and a low-frequency portion;

a frequency modulator for producing a frequency-modulated signal in response to said low-frequency portion of said modulating signal;

a 90° phase-shifter coupled to the output of said frequency-modulator for producing a 90° phase-shifted frequency-modulated signal;

a suppressed-carrier amplitude modulator coupled to the output of said 90° phase-shifter for modulating the 90° phase shifted frequency-modulated signal by said high-frequency portion of said modulating signal to produce a suppressed-carrier amplitude modulated signal; and means coupled to the outputs of said frequency modulator and said suppressed-carrier amplitude modulator for combining said frequency-modulated signal and said suppressed-carrier amplitude modulated signal to produce a combined modulated signal.

13. The modulation system of claim 12, wherein said suppressed-carrier modulator comprises a balanced amplitude-modulator.

14. A modulation system comprising:

means for separating a modulating signal into a high-frequency portion and a low-frequency portion;

a frequency modulator for producing a frequency-modulated signal in response to said low-frequency portion of said modulating signal;

means coupled to the output of said frequency modulator for shifting the phase of said frequency-modulated signal by 90°;

a suppressed-carrier modulator having an input coupled to the output of said phase shifting means for modulating said phase-shifted signal by said high-frequency portion of said modulating signal to produce a suppressed-carrier modulated signal; and means coupled to the outputs of said frequency modulator and said suppressed-carrier modulator for adding said frequency-modulated signal and said suppressed-carrier-modulated signal to produce a combined output signal.

15. The method of modulating a wide-band information signal, comprising the steps of:

separating said wide-band information signal into an upper frequency portion and a lower frequency portion;

frequency modulating a carrier signal by said lower frequency portion of said information signal to produce a frequency-modulated signal;

suppressed-carrier amplitude modulating said frequency-modulated signal by said upper frequency portion of said information signal to produce a suppressed-carrier amplitude modulated signal; and adding said frequency-modulated signal and said suppressed-carrier amplitude modulated signal to produce a composite modulated signal.

16. The method of claim 15, wherein the step of separating said wide-band information signal into an upper frequency portion and a lower frequency portion comprises the steps of:

subtracting said low-frequency portion from said wide-band information signal to produce said high-frequency portion.

17. The method of claim 16, wherein the step of subtracting said low-frequency portion from said wide-band information signal comprises the steps of:

inverting said wide-band information signal; and adding said low-frequency portion to the inverted wide-band information signal to produce said high-frequency portion.

18. The method of claim 15, further comprising the step of modifying the frequency response of said high-frequency portion of said information signal prior to the step of suppressed-carrier amplitude modulating said high-frequency portion.

19. A bandwidth reduction system adapted to have applied thereto a video signal extending over a wide frequency spectrum comprising:

means for separating the video spectrum into first and second subspectra, the first subspectrum containing predominantly lower-frequency video signal components and the second frequency subspectrum containing predominantly upper frequency components;

means coupled to an output of said separating means for wide-deviation frequency-modulating the first subspectrum onto said carrier to produce a frequency-modulated signal;

means coupled to the output of said frequency modulating means for suppressed-carrier amplitude modulating the second subspectrum onto said frequency-modulated signal; and means coupled to the outputs of said frequency modulating means and said suppressed-carrier amplitude modulating means for combining the resultant modulated signals to provide over-all modulated signals effectively occupying a band narrower than would be occupied by the entire video signal if said entire video signal were wide-deviation frequency modulated.

20. A system as in claim 19 further including means for causing a 90° phase shift between said frequency-modulated signal and the amplitude-modulated signal supplied to said combining means.

21. A system as in claim 19 further comprising a 90° phase shifter between the output of said frequency modulator and an input of said amplitude-modulator.

22. A system as in claim 1 further comprising a 90° phase shifter between the output of said frequency-modulator and the input of said suppressed carrier amplitude-modulator.

23. The method of producing a modulated carrier from a modulating signal having a high-frequency portion and a low-frequency portion comprising the steps of producing a carrier signal modulated by said high-frequency modulating signal portion so as to have sidebands of only first order, producing a second carrier signal of the same frequency as and coherent with said first carrier signal and wide deviation frequency-modulated by said low-frequency modulating signal portion and combining said two modulated signals to form a composite modulated signal.

24. The system of claim 22 wherein said 90° phase-shifter comprises a wide band 90° phase-shifter.

25. The system of claim 24 wherein said wide band 90° phase-shifter comprises:

a divide by two circuit coupled to the output of said frequency modulator, said divide by two circuit having first and second complementary outputs;

an inverter coupled to the output of said frequency modulator;

a first NAND circuit having a first input coupled to the output of said inverter and a second input coupled to said first complementary output of said divide by two circuit;

a second NAND having a first input coupled to the output of said inverter and a second input coupled to said second complementary output of said divide by two circuit; and a flip-flop having a first input coupled to the output of said first NAND circuit and a second input coupled to the output of said second NAND circuit, the output of said flip-flop being connected to an input of said suppressed-carrier amplitude modulator.

* * * * *